(12) United States Patent
Park et al.

(10) Patent No.: US 12,488,827 B2
(45) Date of Patent: Dec. 2, 2025

(54) CXL DEVICE AND OPERATION METHOD OF CXL DEVICE

(71) Applicant: Samsung Electronics Co., Ltd., Suwon-si (KR)

(72) Inventors: Changhwi Park, Suwon-si (KR); Junyoung Ko, Suwon-si (KR); Jungmin Bak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 18/463,659

(22) Filed: Sep. 8, 2023

(65) Prior Publication Data

US 2024/0170039 A1 May 23, 2024

(30) Foreign Application Priority Data

Nov. 23, 2022 (KR) ........................ 10-2022-0158460

(51) Int. Cl.
*G11C 11/406* (2006.01)
*G11C 11/4096* (2006.01)

(52) U.S. Cl.
CPC .. *G11C 11/40622* (2013.01); *G11C 11/40615* (2013.01); *G11C 11/4096* (2013.01)

(58) Field of Classification Search
CPC ........ G11C 11/40622; G11C 11/40615; G11C 11/4096; G11C 11/40603; G11C 11/40618; G11C 11/40611; G11C 11/408; G06F 3/0614; G06F 3/0656; G06F 3/0658; G06F 3/0659; G06F 3/0685; G06F 3/0688
USPC ...................................................... 365/222
See application file for complete search history.

(56) References Cited

U.S. PATENT DOCUMENTS

| | | | |
|---|---|---|---|
| 11,222,682 B1 | 1/2022 | Enomoto et al. | |
| 11,354,408 B2 | 6/2022 | Ghosh et al. | |
| 2021/0232504 A1 | 7/2021 | Boyd et al. | |
| 2021/0374087 A1* | 12/2021 | Koufaty | G06F 13/404 |
| 2022/0121398 A1 | 4/2022 | Nale et al. | |
| 2022/0189532 A1 | 6/2022 | Nale et al. | |
| 2022/0261363 A1 | 8/2022 | Confalonieri et al. | |
| 2022/0358042 A1* | 11/2022 | Malladi | G06F 12/0246 |
| 2023/0206988 A1* | 6/2023 | Ayyapureddi | G11C 29/52 365/185.04 |
| 2023/0395120 A1* | 12/2023 | Ayyapureddi | G11C 11/40622 |

* cited by examiner

*Primary Examiner* — Fernando Hidalgo
(74) *Attorney, Agent, or Firm* — Wolf, Greenfield & Sacks, P.C.

(57) ABSTRACT

A CXL device includes at least one memory; a CXL controller configured to receive a request to access the at least one memory via a CXL interface, and to output a memory identifier indicating a first memory of the at least one memory, a command and a row address of the first memory based on the request; and a refresh controller configured to store the row address as a target row address of the first memory and further configured to generate a targeted refresh signal based on a number of receptions of the command for refreshing the target row address in the first memory.

20 Claims, 9 Drawing Sheets

CXL DEVICE AND OPERATION METHOD OF CXL DEVICE

CROSS-REFERENCE TO RELATED APPLICATION

This application claims priority to and the benefit of Korean Patent Application No. 10-2022-0158460 filed in the Korean Intellectual Property Office on Nov. 23, 2022, the entire contents of which are incorporated herein by reference.

BACKGROUND

(a) Field

The present disclosure relates to a Compute Express Link (CXL) device and an operation method of the CXL device.

(b) Description of the Related Art

As computer devices continue to decrease in size and capacities and capabilities thereof continue to increase, minimum device geometries used to manufacture components continue to decrease. As a density of memory cells increases in a memory device, a voltage distribution of a certain row may affect charges of memory cells in adjacent rows. In particular, when a certain row is subjected to an intensively accessed attack, an activation voltage of the certain row may change data stored in memory cells of adjacent rows. This phenomenon is called row hammer. For defense against the row hammer phenomenon, a defense function of refreshing all memory cells at regular periods or a defense function of refreshing an intensively attacked row among memory cells may be applied to the memory device. A memory device that does not include an attack defense function, such as a row hammer defense function, or another attack defense function may be vulnerable to attacks.

SUMMARY

Embodiments of present inventive concept may provide a CXL device and an operation method of the CXL device capable of providing an attack defense function for a memory device.

An embodiment of the present inventive concept provides a CXL device including at least one memory; a CXL controller configured to receive a request to access the at least one memory via a CXL interface, and to output a memory identifier indicating a first memory of the at least one memory, a command and a row address of the first memory based on the request; and a refresh controller configured to store the row address as a target row address of the first memory and further configured to generate a targeted refresh signal based on a number of receptions of the command for refreshing the target row address in the first memory.

The refresh controller may be further configured to set a first threshold value for the number based on metadata of the first memory, and the metadata includes data indicating a target refresh interval (TRI) of the first memory.

The refresh controller may be further configured to set a first threshold value for the number for the first memory, to count the number of receptions of the command to generate a first count value, and to generate the targeted refresh signal when the first count value is equal to the first threshold value.

The refresh controller may be further configured to generate a first random value and to determine, as the target row address, a row address in the request that is received when the first count value equal to the first random value is generated.

The refresh controller may be further configured to generate a new first random value after generating the targeted refresh signal.

The refresh controller may be further configured to reset the first count value after generating the targeted refresh signal.

The command may be an activate command, a read command, or a write command.

The refresh controller may be further configured to transmit the targeted refresh signal to the first memory.

Another embodiment of the present inventive concept provides a computer system including a host configured to generate a request including a memory identifier indicating a first memory of at least one memory, a command, and a row address of the first memory; and a CXL device configured to generate a first random value for the first memory, to count a number of receptions of the command to generate a first count value, to determine, as a target row address, a row address in the request that is received when the first count value equal to the first random value is generated, and to generate a targeted refresh signal for refreshing the target row address in the first memory.

The CXL device may be further configured to set a first threshold value for the first count value for the first memory, and to generate the targeted refresh signal when the first count value is equal to the first threshold value.

The CXL device may be further configured to set the first threshold value for the first count value based on metadata of the first memory, and the metadata may include data indicating a target refresh interval (TRI) of the first memory.

The CXL device may be further configured to generate a new first random value after generating the targeted refresh signal.

The CXL device may be further configured to reset the first count value after generating the targeted refresh signal.

The CXL device and the host may be connected via one CXL interface.

Yet another embodiment of the present inventive concept provides an operation method of a CXL device including receiving a request including a command and a row address for a CXL device; counting a number of receptions of the command to generate a first count value for the CXL device; determining whether the first count value is equal to a preset first random value; determining whether the first count value is equal to a preset first threshold value; and generating a targeted refresh signal for refreshing the row address in the CXL device when the first count value equal to the first random value is generated and when the first count value is equal to the first threshold value.

The operation method may further include setting the first threshold value, based on metadata of a first memory among a plurality of memories in the CXL device.

The receiving of the request may include receiving a request including a first command and a first row address for the first memory, and the generating of the targeted refresh signal may include generating a first signal for refreshing the first row address among a plurality of row addresses of the first memory.

The operation method may further include transmitting the first signal to the first memory.

The operation method may further include generating a new first random value after generating the targeted refresh signal.

The operation method may further include resetting the first count value after generating the targeted refresh signal.

DETAILED DESCRIPTION OF THE EMBODIMENTS

Figure 1:
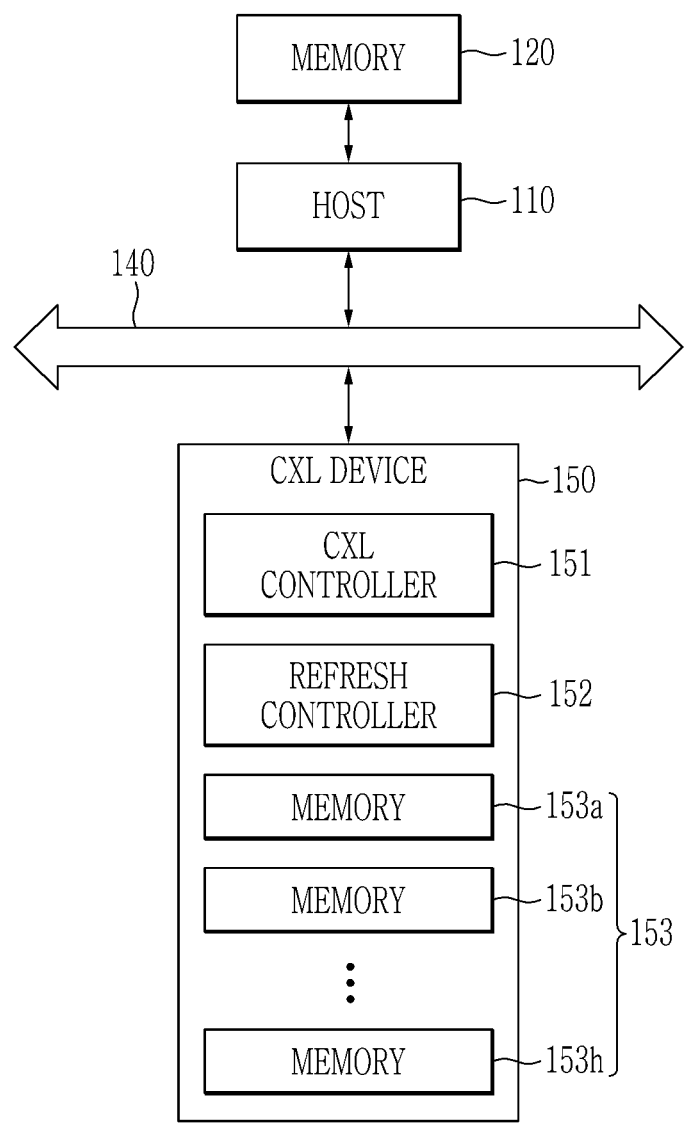
FIG. 1 is a block diagram illustrating a computer system according to an embodiment.

Hereinafter, example embodiments will be described with reference to the accompanying drawings. The same reference numerals are used for the same components in the drawings, and duplicate descriptions thereof are omitted. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

Accordingly, the drawings and description are to be regarded as illustrative in nature and not restrictive. In the flowcharts described with reference to the drawings in this specification, the order of the operations may be changed, several operations may be merged, certain operations may be divided, and specific operations may not be performed in accordance with different embodiments of the inventive concept.

In this specification, expressions described in singular can be interpreted as singular or plural unless explicit expressions such as "one" or "single" are used. In this specification, terms including ordinal numbers, such as first and second may be used to describe various constituent elements, but the constituent elements are not limited by the terms. The terms may be only used to distinguish one constituent element from another constituent element.

FIG. 1 is a block diagram illustrating a computer system according to an embodiment.

Referring to FIG. 1, a computer system 100 may include a host 110, a memory 120, and a compute express link (CXL) device 150. The computer system 100 may include two or more CXL devices 150. In some embodiments, the computer system 100 may be included in a user device, such as a personal computer (PC), a laptop computer, a server, a media player and a digital camera, or an automotive device, such as a navigation device, a black box and an electric device for a vehicle. In other embodiments, the computer system 100 may be a mobile system such as a mobile phone, a smart phone, a tablet personal computer (PC), a wearable device, a healthcare device or an Internet of Things (IOT) device.

The host 110 may be configured to control overall operations of the computer system 100. In an embodiment, the host 110 may be one of various processors, such as a Central Processing Unit (CPU), Graphics Processing Unit (GPU), Neural Processing Unit (NPU), and Data Processing Unit (DPU)

In an embodiment, the host 110 may include a single core processor or a multi-core processor.

The host 110 and the CXL device 150 may be configured to communicate with each other using CXL.mem, which is a memory access protocol. CXL.mem may be a memory access protocol that supports memory access. The host 110 may be configured to access a memory 153 in the CXL device 150 through CXL.mem. The host 110 may be configured to transmit, to the CXL device 150, a request including a memory identifier indicating one of memories 153a, 153b, . . . , and 153h, a command and/or an address. In some embodiments, the command may include an activate command, a read command, and/or a write command.

The activate command may be a command to switch a target row of any one of the memories 153a, 153b, . . . , and 153h in the CXL device 150 into an active state to write data to the CXL device 150 or to read data from the CXL device 150. The CXL device 150 may be configured such that a memory cell of a target row is activated (for example, driven) in response to an activate command. The read/write command may be a command for performing a read or write operation on a target memory cell of a row switched to an active state.

The host 110 may be configured to transmit a request to the CXL device 150 through a CXL interface 140.

The memory 120 may be used as a main memory or a system memory of the computer system 100. In an embodiment, the memory 120 may be a dynamic random access memory (DRAM) device and may have a form factor of a dual in-line memory module (DIMM). However, embodiments of the present inventive concept are not limited thereto, and the memory 120 may include a non-volatile memory such as a flash memory, a PRAM, an RRAM, and an MRAM.

In some embodiments, the host 110 may be directly connected to the memory 120. In some embodiments, the memory 120 may be configured to directly communicate with the host 110 via a DDR interface. In an embodiment, the host 110 may include a memory controller configured to control the memory 120. However, the embodiments of present inventive concept are not limited thereto, and the memory 120 may be configured to communicate with the host 110 via various interfaces.

The CXL device 150 may be implemented as an individual memory device or memory module. In a case in which there are a plurality of CXL devices 150, each of the plurality of CXL devices 150 may be connected to the CXL interface 140 through different physical ports. That is, the plurality of CXL devices 150 are connected to the CXL interface 140, so that a memory area managed by the host 110 can be increased in capacity.

The CXL device 150 may include a CXL controller 151, a refresh controller 152, and a memory 153.

The CXL controller 151 may include an intellectual property (IP) circuit designed for implementation of an application specific integrated circuit (ASIC) and/or a field-programmable gate array (FPGA). In various embodiments, the CXL controller 151 may be implemented to support a CXL protocol (for example, a CXL 2.0 protocol or any other version). The CXL controller 151 may be configured to convert CXL packets to signals of memory interfaces of the memory 153. For example, the CXL controller 151 may convert a CXL packet transmitted from the host 110 into a memory identifier indicating any one of the memories 153a, 153b, . . . , and 153h, a command, an address, and data.

The CXL controller 151 may be configured to convert data received from the host 110 and to store the converted data in the memory 153 or to convert data stored in the memory 153 and to transmit the converted data to the host 110.

The refresh controller 152 may be configured to count the number of commands transmitted to each of the memories 153a, 153b, . . . , and 153h. For example, the refresh controller 152 may count the number of commands targeting the same memory (for example, 153a) among commands transmitted from the CXL controller 151.

In some embodiments, the refresh controller 152 may be configured to generate a targeted refresh signal for the memory 153. The targeted refresh signal may include a refresh command and an address indicating an arbitrary target row in the memories 153a, 153b, . . . , and 153h. Specifically, the refresh controller 152 may be configured to generate a targeted refresh signal for the memory 153a when a count value of commands to be transmitted to any one memory (for example, 153a) is equal to or greater than a threshold value corresponding to the memory 153a. In some embodiments, the refresh controller 152 may be configured to set a threshold value of each of the memories 153a, 153b, . . . , and 153h based on metadata of each of the memories 153a, 153b, . . . , and 153h. Metadata may include data indicating lifetime information relating to the memory 153. For example, in a case in which the memory 153 is a refurbish memory, a remaining lifetime of the memory 153 calculated based on the production year and month of the memory 153 and the refurbishment collection year and month may be included in metadata. As another example, the memory 153 may calculate the remaining lifetime, based on an operating time, the number of received commands, and the like, and store the calculated remaining lifetime as metadata. Metadata may include information about a target refresh interval (TRI) of the memory 153 based on the remaining lifetime. For example, the longer the remaining lifetime is, the longer the target refresh interval is. In some embodiments, the threshold value may be based on the target refresh interval. For example, the longer the target refresh interval (TRI) is, the greater the threshold value may be. In some embodiments, the threshold value may be a natural number.

The refresh controller 152 may be configured to determine one row address, among addresses transmitted from the CXL controller 151, as a target row address. The refresh controller 152 may be configured to determine the target row address at any timing. The refresh controller 152 may be configured to transmit a targeted refresh signal including the target row address to the memory 153. The memory 153 may be configured to refresh a target row indicated by the target row address, in response to receiving the targeted refresh signal from the refresh controller 152.

The refresh controller 152 may be configured to mitigate row hammer in the memory 153 by refreshing a target row based on the number of receptions of a command targeting the memory 153, regardless of whether a specific row in the memory 153 is activated or not.

The memory 153 may include a dynamic random access memory (DRAM), a not-AND (NAND) flash, a high bandwidth memory (HBM), a hybrid memory cube (HMC), a dual in-line memory module (DIMM), an Optane DIMM, a non-volatile DIMM (NVMDIMM), a double data rate synchronous DRAM (DDR SDRAM) and a low-power double data rate synchronous dynamic random access memory (LPDDR SDRAM), or a combination thereof.

In an embodiment, the host 110 and the CXL device 150 may be configured to share the same interface as each other. For example, the host 110 and the CXL device 150 may communicate with each other via the CXL interface 140. In an embodiment, the CXL interface 140 may be a low-latency and high-bandwidth link configured to support coherency, memory access, and dynamic protocol multiplexing of an I/O protocol to enable various connections between accelerators, memory devices, or various electronic devices.

In some embodiments, the host 110 may be configured to communicate with the CXL device 150 via the CXL interface 140.

Hereinafter, for better understanding and ease of description, it is assumed that the host 110 and the CXL device 150 communicate with each other through the CXL interface 140. However, the embodiments of the present inventive concept are not limited thereto, and the host 110 and the CXL device 150 may be configured to communicate with each other, based on various computing interfaces, such as a GEN-Z protocol, an NVLink protocol, a CCIX protocol, and/or an Open CAPI protocol.

Figure 2:
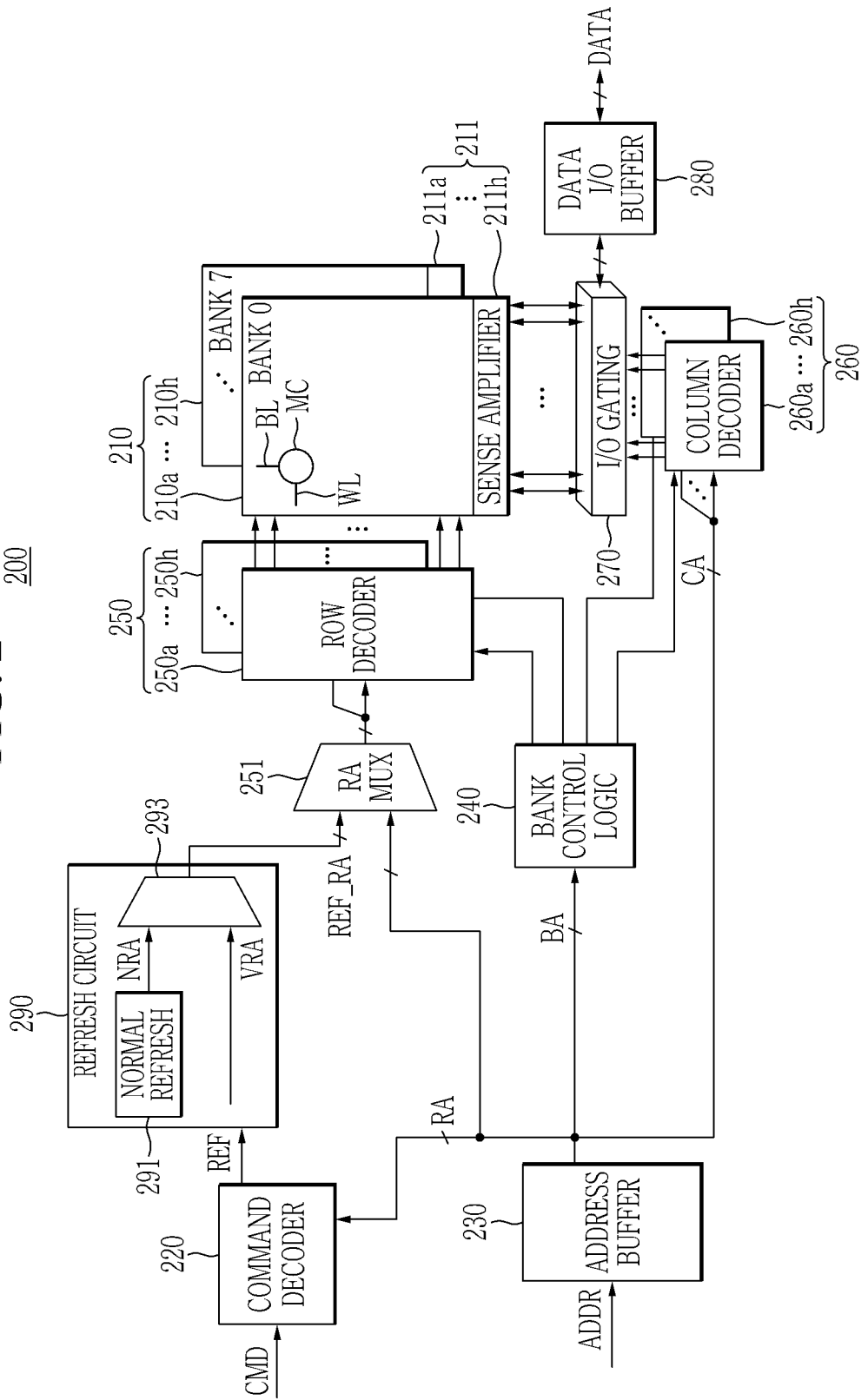
FIG. 2 is a block diagram illustrating a CXL device according to an embodiment.

FIG. 2 is a block diagram illustrating a CXL device according to an embodiment.

Referring to FIG. 2, a memory 200 may include a memory cell array 210, a sense amplifier 211, a command decoder 220, an address buffer 230, a row decoder 250, a column decoder 260, an input/output (I/O) gating circuit 270, a data I/O buffer 280, and a refresh circuit 290.

The memory cell array 210 may include a plurality of memory cells MC. In some embodiments, the memory cell array 210 may include a plurality of memory banks 210a to 210h. Although eight memory banks (BANK0 to BANK7) 210a to 210h are shown in FIG. 2, the number of memory banks is not limited thereto. Each of the memory banks 210a to 210h may include a plurality of rows, a plurality of columns, and a plurality of memory cells MC aligned at intersections of the plurality of rows and the plurality of columns. In some embodiments, the plurality of rows may be defined by a plurality of word lines (WL) and the plurality of columns may be defined by a plurality of bit lines (BL).

The command decoder 220 may be configured to generate a control signal to cause the memory 200 to perform a read operation, a write operation, or a refresh operation. In some embodiments, the command decoder 220 may be configured to decode a command CMD to generate a targeted refresh command REF.

The address buffer 230 may be configured to receive an address ADDR provided from the CXL controller (151 in FIG. 1). The address ADDR may include a row address RA indicating a row of the memory cell array 210 and a column address CA indicating a column of the memory cell array 210. The row address RA is provided to the row decoder 250 and the column address CA is provided to the column decoder 260. The row address RA may be provided to the refresh circuit 290 via the command decoder 220 or may be directly provided to the refresh circuit 290. In some embodiments, the row address RA may be provided to the row decoder 250 via a row address multiplexer 251. In some embodiments, the address ADDR may further include a bank address BA indicating a memory bank.

In some embodiments, the memory 200 may further include the row address multiplexer 251. The row address multiplexer 251 may be configured to receive a row address RA from the address buffer 230 and a row address REF_RA to be refreshed from the refresh circuit 290. The row address multiplexer 251 may be configured to selectively output the row address RA received from the address buffer 230 and the row address REF_RA received from the refresh circuit 290 to the row decoder 250. In some embodiments, the row address RA received from the address buffer 230 and the row address REF_RA received from the refresh circuit 290 may be the same. For example, when the memory 200 receives a targeted refresh signal including a target row address VRA from the refresh controller 152, the address buffer 230 may output the target row address VRA to the refresh circuit 290, and the refresh circuit 290 may output the target row address VRA as the row address REF_RA.

The row decoder 250 may be configured to select a row to be activated among a plurality of rows of the memory cell array 210, based on the row address RA or REF_RA. To this end, the row decoder 250 may be configured to apply a drive voltage to a word line corresponding to the row to be activated. In some embodiments, a plurality of row decoders 250a to 250h corresponding to the plurality of memory banks 210a to 210h, respectively, may be provided.

The column decoder 260 may be configured to select a column to be activated among a plurality of columns of the memory cell array 210 based on the column address. To this end, the column decoder 260 may be configured to activate the sense amplifier 211 corresponding to the column address CA through the I/O gating circuit 270. In some embodiments, a plurality of column decoders 260a to 260h corresponding to the plurality of memory banks 210a to 210h, respectively, may be provided. In some embodiments, the I/O gating circuit 270 may be configured to gate input and output data, and may include a data latch for storing data read from the memory cell array 210 and a write driver for writing data to the memory cell array 210. Data read from the memory cell array 210 may be sensed by the sense amplifier 211 and stored in the I/O gating circuit 270 (for example, a data latch). In some embodiments, a plurality of sense amplifiers 211a to 211h corresponding to the plurality of memory banks 210a to 210h, respectively, may be provided.

In some embodiments, the memory 200 may further include a bank control logic 240 configured to generate a bank control signal in response to the bank address BA. In response to the bank control signal, a row decoder 250 corresponding to the bank address BA among the plurality of row decoders 250a to 250h may be activated, and a column decoder 260 corresponding to the bank address BA among the plurality of column decoders 260a to 260h may be activated.

In some embodiments, data read from the memory cell array 210 (for example, data stored in the data latch) may be provided to the CXL controller 201 through the data I/O buffer 280. Data to be written in the memory cell array 210 may be provided from the CXL controller 201 to the data I/O buffer 280, and the data provided to the data I/O buffer 280 may be provided to the I/O gating circuit 270.

The refresh circuit 290 may be configured to control refresh of rows in the memory cell array 210.

The refresh circuit 290 may include a normal refresh circuit 292 and a refresh row address selector 293.

The normal refresh circuit 292 may be configured to calculate a row address NRA when a normal refresh operation is to be performed, and to output the row address NRA in response to a normal refresh command. The normal refresh command may be a refresh command instructing a normal refresh operation, for example, an operation for sequentially refreshing rows of the memory cell array 210. The refresh circuit 290 may be configured to repeatedly generate the normal refresh command for each preset normal refresh interval. The normal refresh interval may be set according to a reliability performance characteristic of the memory 200 and a type of the memory 200.

The refresh row address selector 293 may be configured to receive the row address NRA and the target row address VRA from the normal refresh circuit 292. The refresh row address selector 293 may be configured to selectively output the row address NRA or the target row address VRA. In some embodiments, the refresh row address selector 293 may be configured to output the row address NRA from the normal refresh circuit 292 as a refresh row address REF_RA, in response to the normal refresh command, and to output the target row address VRA as the refresh row address REF_RA, in response to the targeted refresh command REF. In some embodiments, the refresh circuit 290 may be configured to receive the target row address VRA through the address buffer 230 and/or the command decoder 220.

Figure 3:
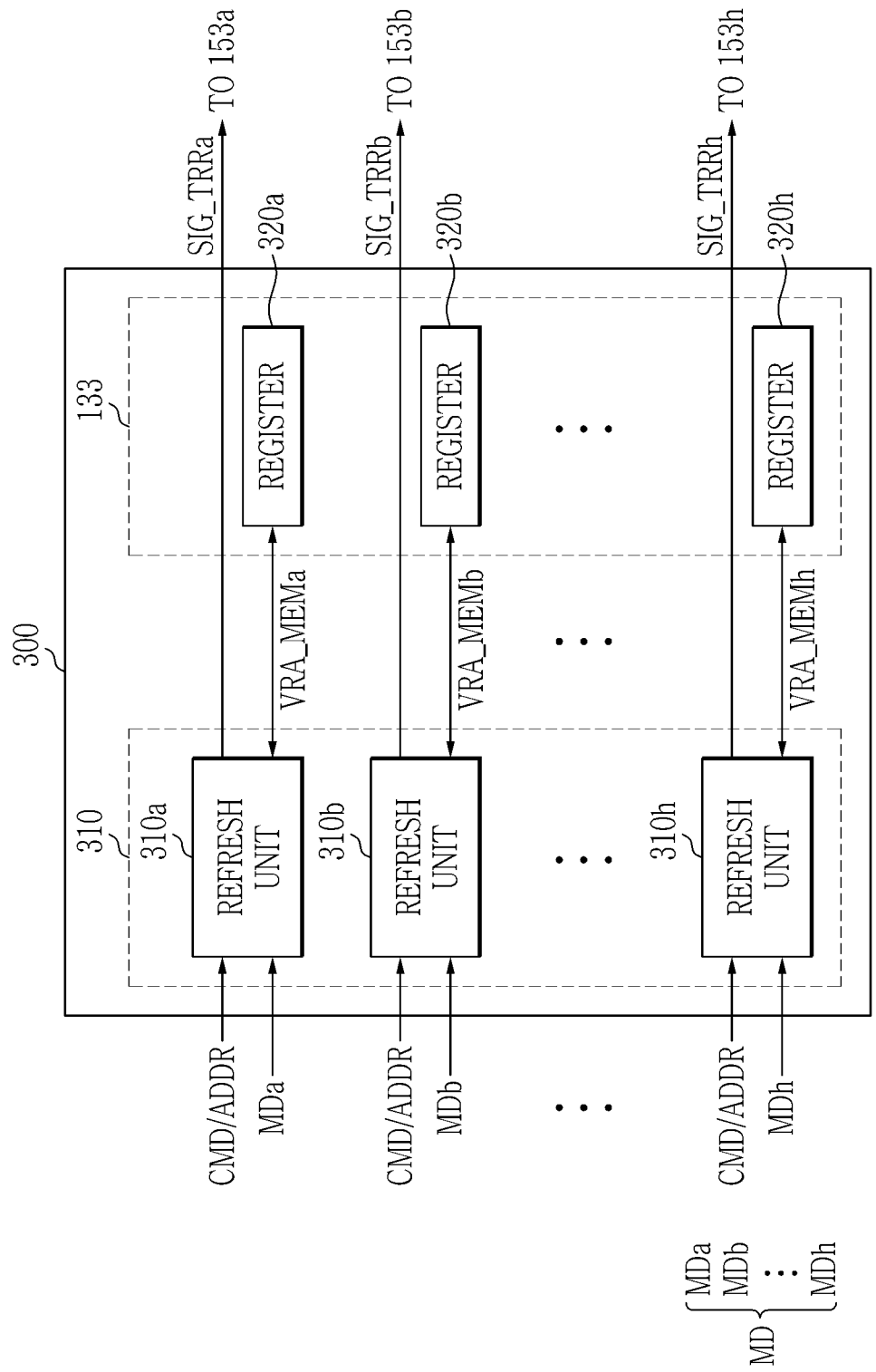
FIG. 3 is a block diagram illustrating a refresh controller according to an embodiment.

FIG. 3 is a block diagram showing a refresh controller according to an embodiment.

As shown in FIG. 3, a refresh controller 300 may include a refresh unit 310 and a register 320.

Refresh units 310a, 310b, . . . , 310h may be each configured to generate targeted refresh signals SIG_TRRa, SIG_TRRb, . . . , and SIG_TRRh for each of the corresponding memories 153a, 153b, . . . , and 153h. The targeted refresh signals SIG_TRRa, SIG_TRRb, . . . , and SIG_TRRh may be signals that cause the refresh controller 300 to cause any one of the memories 153a, 153b, . . . , and 153h to perform a refresh operation on a target row to be refreshed. Here, the target row may be a row corresponding to any one row address among row addresses received corresponding to commands counted by each of the refresh units 310a, 310b, . . . , and 310h.

In some embodiments, the refresh unit 310 may be configured to count commands CMD for the corresponding memories 153a, 153b, . . . , and 153h. In some embodiments, the refresh unit 310 may be configured to count an activate command. The refresh unit 310 may be configured, when a count value of commands for an arbitrary memory (for example, 153a) of the memories 153 reaches a threshold value, to generate a targeted refresh signal SIG_TRRa for the arbitrary memory 153a. That is, the targeted refresh signal SIG_TRRa may be a signal for refreshing one row address among addresses of rows recently activated in the arbitrary memory 153a. The targeted refresh signal SIG_TRRa may include a row address indicating a row that is repeatedly activated. In some embodiments, the refresh unit 310 may also be configured to count read/write commands.

In some embodiments, each of the refresh units 310 may be configured to store a count value of commands for each memory 153, for each memory 153. The count value for each memory 153 may be initialized or reset after transmitting the targeted refresh signals (SIG_TRRa, SIG_TRRb, . . . , and SIG_TRRh) to the corresponding memories 153.

In some embodiments, each of the refresh units 310 may be configured to select an rth (r is a natural number) received row address among the received row addresses, as a target row address. Each of the refresh units 310 may be configured to randomly generate an r value among natural numbers equal to or less than a threshold value. Specifically, each of the refresh units 310 may be configured to determine the received row address as the target row address VRA when the count value of commands reaches a random value r.

Each of the registers 320 may be configured to store target row addresses VRA_MEMa, VRA_MEMb, . . . , and VRA_MEMh for the corresponding memories 153*a*, 153*b*, . . . , and 153*h*. Each of the refresh units 310 may be configured to store the target row address VRA in the registers 320 corresponding to the memories 153*a*, 153*b*, . . . , and 153*h*, respectively.

Figure 4:
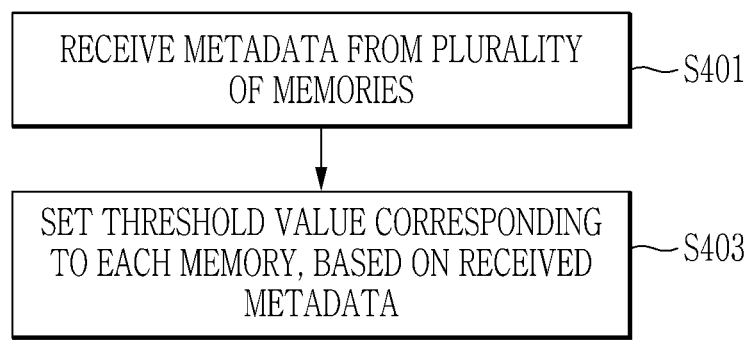
FIG. 4 is a flowchart illustrating a method of setting a refresh interval by the refresh controller according to an embodiment.

An operation of the refresh controller 300, according to an embodiment, will be described with reference to FIG. 4. FIG. 4 is a flowchart illustrating a method of setting a refresh interval by the refresh controller 300 according to an embodiment.

First, the refresh controller 300 receives metadata (MD) from the memory 153 (S401). The metadata MD may include information about reliability, performance, a type, and the like of each memory 153.

Thereafter, the refresh controller 300 sets a threshold value corresponding to each memory 153 based on the received metadata (S403). In other embodiments, when the memory 153 is a non-volatile memory, the refresh controller 300 may not set the threshold value.

Figure 5:
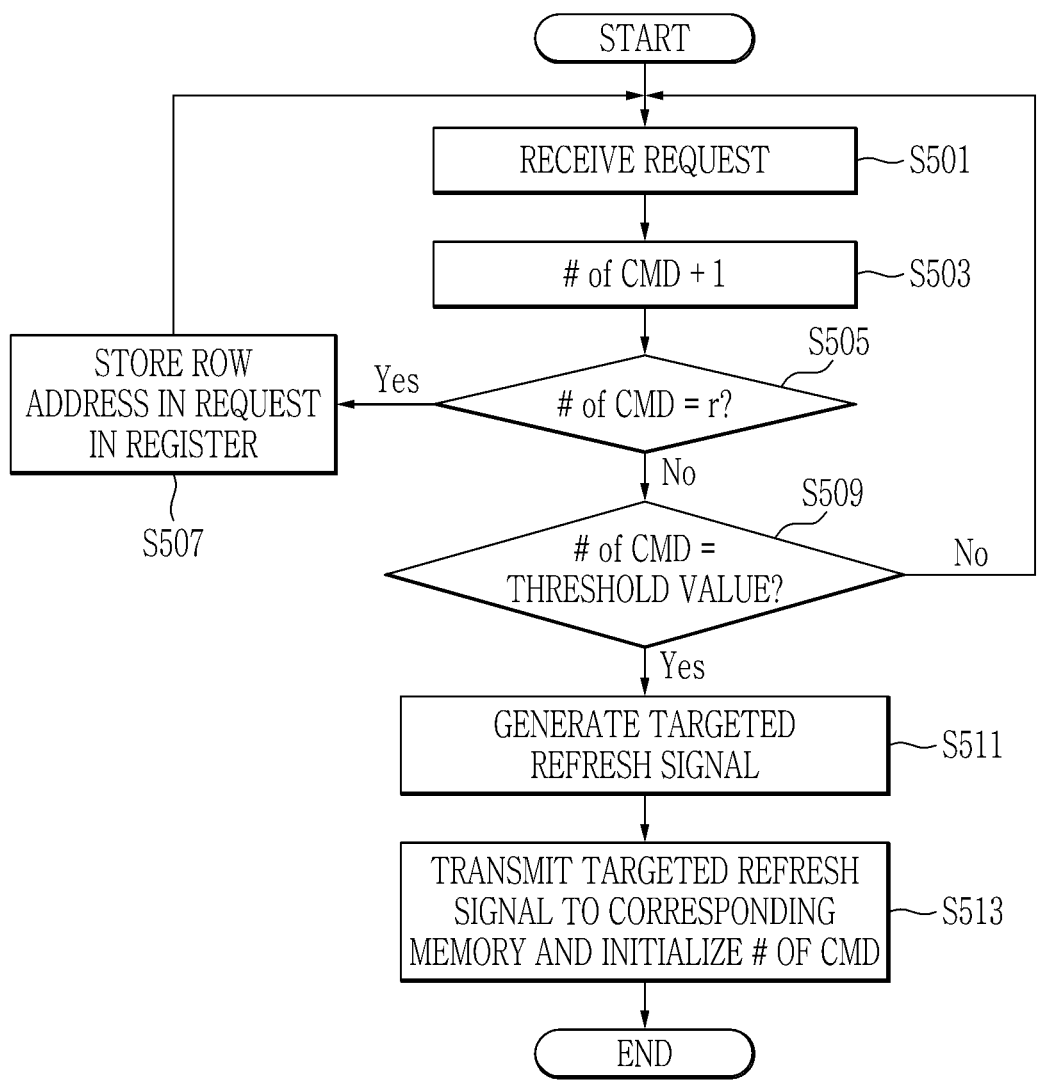
FIG. 5 is a flowchart illustrating a method of generating a targeted refresh signal according to an embodiment.

An operation of the refresh controller 300, according to an embodiment, will be described with reference to FIG. 5. FIG. 5 is a flowchart showing a method of generating a targeted refresh signal according to an embodiment.

The CXL controller 151 receives a request from the host 110 (or another CXL device) (S501). Here, the request may include a command and an address. In some embodiments, the request may further include a memory identifier. For better understanding and ease of description, it is assumed in FIG. 5 that the CXL controller 151 receives only a request including a memory identifier indicating the memory 153*a*. The refresh controller 300 may perform the same operation on each memory 153, for each memory identifier.

The refresh controller 300 receives a command and an address from the CXL controller 151, and increments a count value of the number of commands (# of CMD) (S503). Specifically, the refresh controller 300 may increment the count value of commands (# of CMD). The refresh controller 300 may increment the count value of commands (# of CMD), regardless of the type of the command. The refresh controller 300 may count the number of times that the host 110 accesses the memory 153*a*.

The refresh controller 300 determines whether the count value of commands (# of CMD) is r (S505).

Here, r is a natural number equal to or less than a threshold value and may be a random value generated by the refresh controller 300. The threshold value may be a natural number equal to or greater than 1, which is preset based on the metadata received by the refresh controller 300 from the memory 153*a*.

When the count value of commands (# of CMD) is r, the refresh controller 300 stores the received row address in the register 320*a* (S507). Here, the row address stored in the register 320*a* may be a target row address VRA. The refresh controller 300 may generate a new r value after generating the target row address VRA.

When the count value of commands (# of CMD) is not r, the refresh controller 300 determines whether the count value of commands (# of CMD) is the threshold value (S509). In some embodiments, when the type of the memory 153*a* is a non-volatile memory, the refresh controller 300 may not set the threshold value. In this case, the refresh controller 300 may determine that the count value of commands (# of CMD) is not the threshold value, and may perform block S501.

When the count value of commands (# of CMD) is the threshold value, the refresh controller 300 generates a targeted refresh signal (SIG_TRRa) (S511).

In some embodiments, the refresh controller 300 may receive the target row address VRA_MEMa transferred from the register 320*a* and generate the targeted refresh signal SIG_TRRa.

The refresh controller 300 transmits the targeted refresh signal SIG_TRRa to the corresponding memory 153*a* and initializes or resets the count value of commands (# of CMD) (S513). Specifically, when the count value of commands (# of CMD) is the threshold value, the refresh controller 300 may transmit the targeted refresh signal SIG_TRRa to the memory 153*a* corresponding to the memory identifier included in the request. In addition, the refresh controller 300 may initialize or reset the count value of commands (# of CMD).

The memory 153*a* may perform a target refresh for row hammer mitigation, instead of normal refresh, in response to the targeted refresh signal SIG_TRRa. By the target refresh, the memory 153*a* can refresh a row corresponding to the target row address VRA stored in the register 320*a* of the refresh controller 300.

Figure 6:
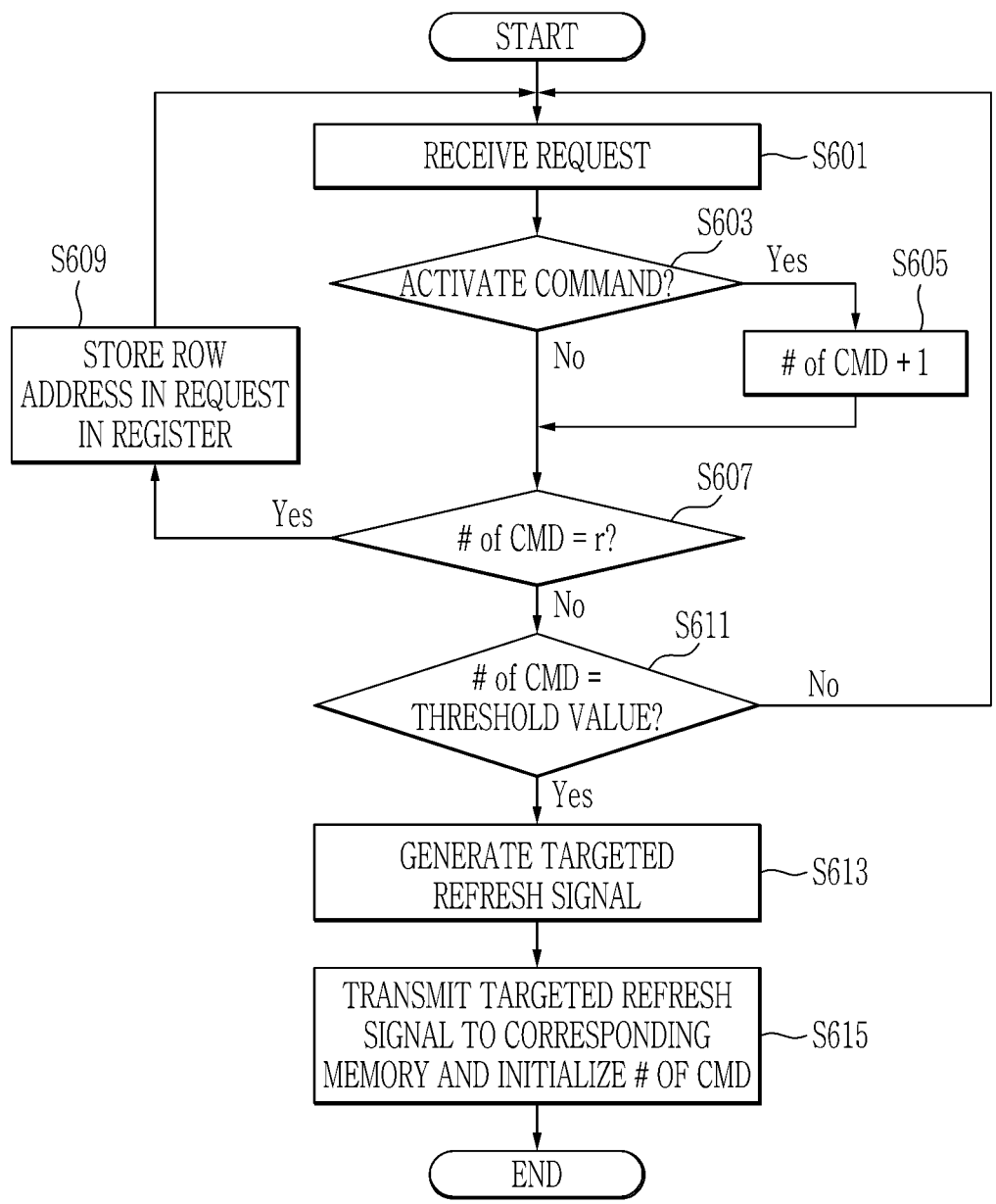
FIG. 6 is a flowchart illustrating a method of generating a targeted refresh signal according to another embodiment.

FIG. 6 is a flowchart illustrating a method of generating a targeted refresh signal according to another embodiment.

The CXL controller 151 receives a request from the host 110 (S601). Here, the request may include a command and an address. In some embodiments, the request may further include a memory identifier. For better understanding and ease of description, it is assumed in FIG. 6 that the CXL controller 151 receives only a request including a memory identifier indicating the memory 153*a*. It will be understood that the refresh controller 300 may configured to perform the same operation on each memory 153 for each CXL device identifier.

The refresh controller 300 receives a command and an address from the CXL controller 151, and determines whether the received command includes an activate command (S503). Here, the activate command may be a command for accessing any one of the memory banks of the memory 153 to perform an internal operation.

When the received command includes an activate command, the refresh controller 300 may increment the count value of commands (# of CMD) (S605).

When the received command does not include an activate command, the refresh controller 300 determines whether the count value of commands (# of CMD) is r (S607).

When the count value of commands (# of CMD) is r, the refresh controller 300 stores the received row address in the register 320*a* (S609).

When the count value of commands (# of CMD) is not r, the refresh controller 300 determines whether the count value of commands (# of CMD) is the threshold value (S611).

When the count value of commands (# of CMD) is not the threshold value, the refresh controller 300 may perform block S601 again.

When the count value of commands (# of CMD) is the threshold value, the refresh controller 300 generates a targeted refresh signal (SIG_TRRa) (S613).

In some embodiments, the refresh controller 300 may receive the target row address VRA transferred from the register 320a and generate the targeted refresh signal SIG_TRRa.

The refresh controller 300 transmits the targeted refresh signal SIG_TRRa to the corresponding memory 153a and initializes or resets the count value of commands (# of CMD) (S615).

Specifically, when the count value of commands (# of CMD) is the threshold value, the refresh controller 300 may transmit the targeted refresh signal SIG_TRRa to the memory 153a corresponding to the memory identifier included in the request. In addition, the refresh controller 300 may initialize the count value of commands (# of CMD).

The memory 153a may perform a target refresh for row hammer mitigation, instead of normal refresh, in response to the targeted refresh signal SIG_TRRa. By the target refresh, the memory 153a can refresh a row corresponding to the target row address VRA_MEMa stored in the register 320a of the refresh controller 300.

Figure 7:
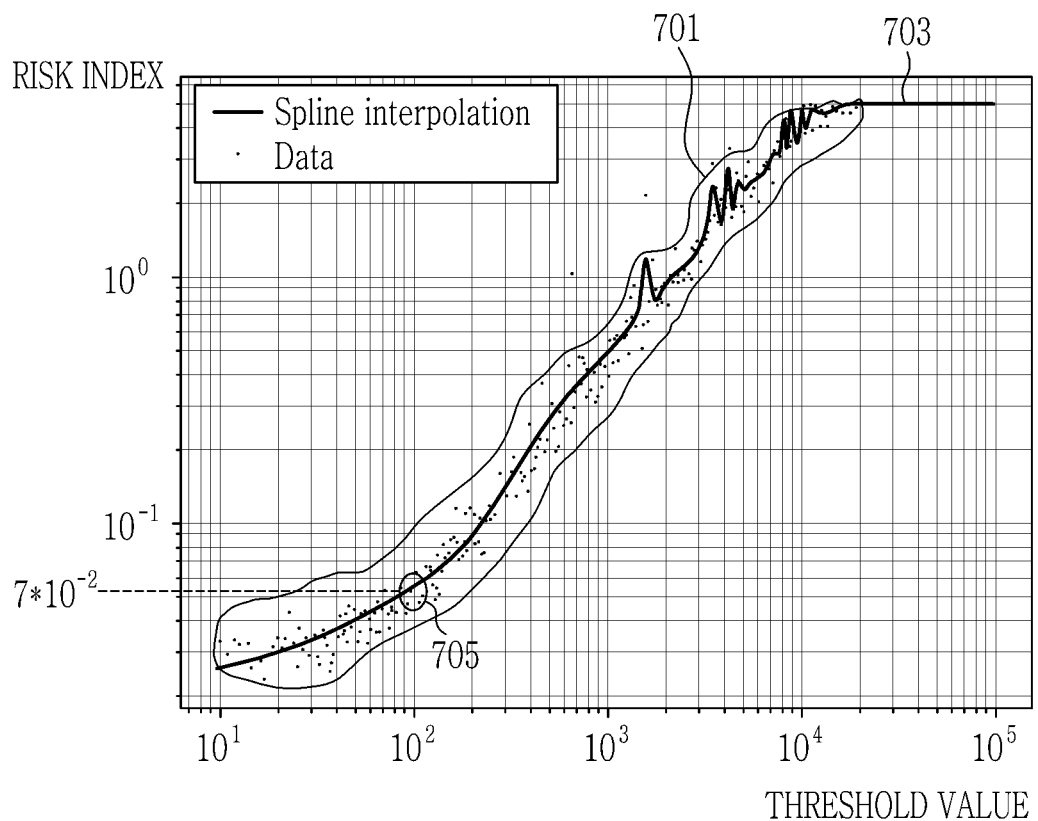
FIG. 7 is a graph of risk indexes versus threshold values according to an embodiment.

FIG. 7 is a graph of risk indexes versus threshold values according to an embodiment.

In FIG. 7, the x-axis represents threshold values of a counter, and the y-axis represents risk indexes. The threshold value may indicate a maximum count value of commands (# of CMD) that may be input to the CXL device without generating a row hammer. The risk index may be an index proportional to a probability that data in an adjacent row will be changed by row hammer.

Referring to FIG. 7, a plurality of first input data 701 and a second graph 703 are shown.

The plurality of first input data 701 may be data representing risk indexes according to threshold values when a row hammer attack pattern has a rule that is sequentially repeated in a round-robin format.

The second graph 703 is a graph obtained by applying spline interpolation to the plurality of first input data 701.

For example, the second graph 703 may be a graph obtained by applying spline interpolation to an inner section by using any two first input data items 701 among the plurality of first input data 701.

Referring to FIG. 7, as the threshold value decreases, the refresh controller 300 can generate more targeted refresh signals. That is, the memory 153 can perform more target refreshes. Accordingly, the risk index may decrease as the threshold value decreases.

Meanwhile, efficiency may decrease as the memory 153 performs more target refreshes. Accordingly, a method for deriving an optimal or desired threshold value will be described with reference to FIG. 8.

Figure 8:
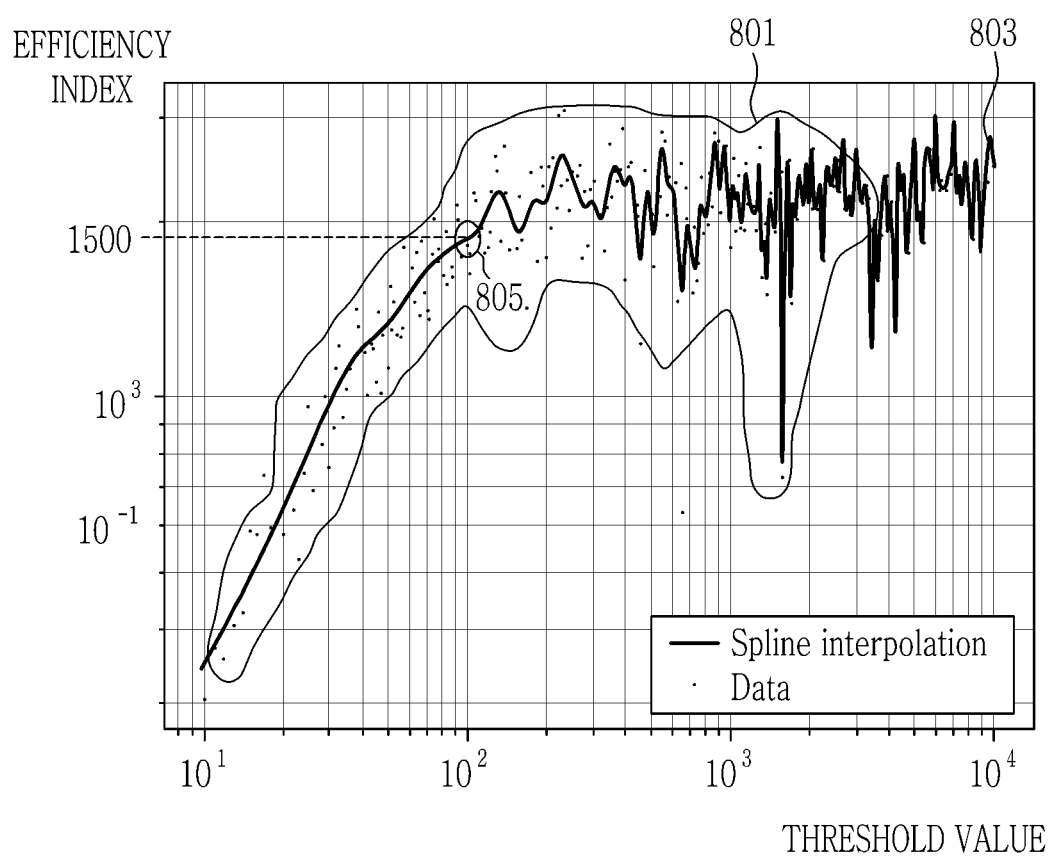
FIG. 8 is a graph of efficiency indexes versus threshold values according to an embodiment.

FIG. 8 is a graph of efficiency indexes versus threshold values according to an embodiment.

In FIG. 8, the x-axis represents threshold values of the counter, and the y-axis represents efficiency indexes. The efficiency index may be an index obtained by dividing the threshold value by the risk index.

Referring to FIG. 8, a plurality of first input data 801 and a second graph 803 are shown.

The plurality of first input data 801 may be data items representing an efficiency index of each of the plurality of first input data 701 according to FIG. 7.

The second graph 803 is a graph obtained by applying the spline interpolation method to the plurality of first input data 801. The spline interpolation method may be a method of interpolating data by dividing an entire section where data is located into sub-sections and connecting each sub-section with a second order polynomial.

Referring to FIG. 8, when the threshold value is approximately 100 (threshold for a count of a number of times a command is received) (805) on the second graph 803, the efficiency index may have a value of about 1500. Thereafter, even when the threshold value increases, the efficiency index may have a value around 1500.

Meanwhile, referring to FIG. 7, when the threshold value is approximately 100 (705) on the second graph 703, the risk index may have a value of about 0.07.

A method of generating a targeted refresh signal according to an embodiment does not count the number of commands that are input to a specific row in the memory 153 included in the CXL device 150, but may count the number of commands that are input to any row in the memory 153. Accordingly, the refresh controller according to an embodiment does not require an address table to store addresses for all rows of the memory 153, but requires only a register for storing any one address. Therefore, an area of a circuit required to store the row addresses of the memory 153 can be reduced.

In the method of generating a targeted refresh signal according to an embodiment, the refresh controller 300 generates and transfers a targeted refresh signal to the memory 153 even when there is no separate targeted refresh signal generation circuit in the memory 153. Therefore, the reliability of the memory 153 can be increased and the production cost of the CXL device can be reduced.

However, as described with reference to FIGS. 7 and 8, in the method in which the refresh controller 300 according to an embodiment generates a targeted refresh signal to perform target refresh of a CXL device, more target refreshes may need to be performed, as compared with a method of performing target refresh in a CXL device of the related art.

However, as the number of memories 153 connected to one refresh controller 300 increases, the number of requests transmitted to one memory 153 may also decrease in terms of probability. Accordingly, the number of target refreshes performed per any memory 153 can be reduced by the number of memories 153 connected to the refresh controller 300.

Figure 9:
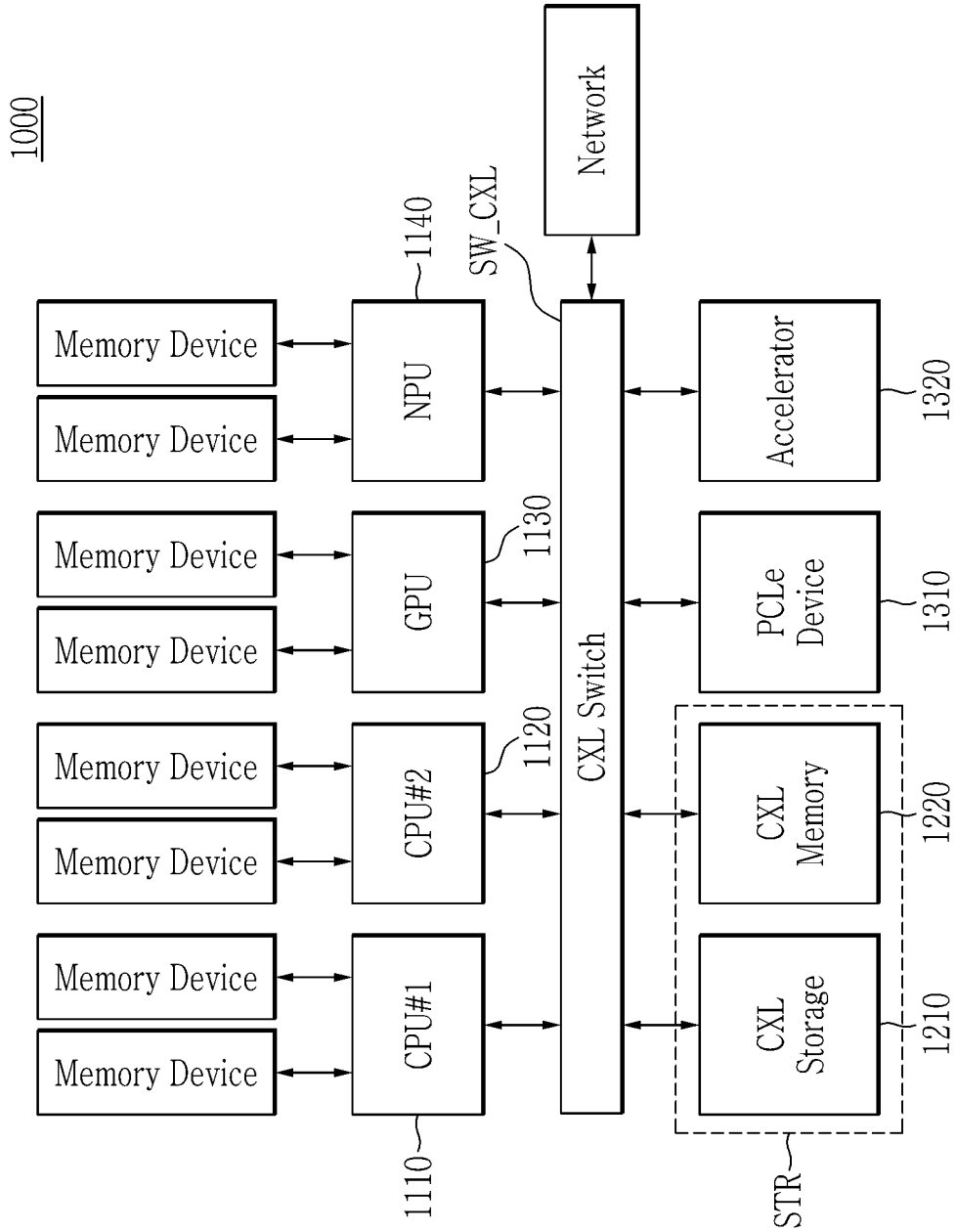
FIG. 9 is a block diagram illustrating a computer system according to an embodiment.

FIG. 9 is a block diagram showing a computer system according to an embodiment. For better understanding and ease of description, detailed descriptions of the components described above are omitted. Referring to FIG. 9, a computer system 1000 may include a first CPU 1110, a second CPU 1120, a GPU 1130, an NPU 1140, a CXL switch SW_CXL, a CXL storage 1210, a CXL memory 1220, a PCIe device 1310, and an accelerator 1320.

The first CPU 1110, the second CPU 1120, the GPU 1130, the NPU 1140, the CXL storage 1210, the CXL memory 1220, the PCIe device 1310, and the accelerator 1320 can be commonly connected to the CXL switch SW_CXL, and may be configured to communicate with each other via the CXL switch SW_CXL, respectively.

In an embodiment, each of the first CPU 1110, the second CPU 1120, the GPU 1130, and the NPU 1140 may be the host described with reference to FIGS. 1 to 8, and may be directly connected to individual memory devices.

In an embodiment, the CXL storage 1210 and the CXL memory 1220 may be the CXL devices described with reference to FIGS. 2 to 8. The CXL memory 1220 may be configured to perform a refresh operation on an arbitrary row in the CXL memory 1220, based on the number of commands received through the CXL switch SW_CXL from any one or more of the first CPU 1110, the second CPU 1120, the GPU 1130, and the NPU 1140.

In an embodiment, the CXL switch SW_CXL may be connected to the PCIe device 1310 or accelerator 1320 configured to support various functions, and the PCIe device 1310 or accelerator 1320 may be configured to communicate with each of the first CPU 1110, the second CPU 1120, the GPU 1130, and the NPU 1140 via the CXL switch SW_CXL, or to access a storage space STR including the CXL storage 1210 and the CXL memory 1220.

In an embodiment, the CXL switch SW_CXL may be connected to an external network or Fabric, and may be configured to communicate with an external server via the external network or Fabric.

While example embodiments have been shown and described above, it will be apparent to those skilled in the art that modifications and variations could be made without departing from the scope of the present inventive concept as defined by the appended claims.

What is claimed is:

1. A CXL device comprising:
   at least one memory;
   a CXL controller configured to receive a request to access the at least one memory via a CXL interface, and to output a memory identifier indicating a first memory of the at least one memory, a command, and a row address of the first memory based on the request; and
   a refresh controller configured to store the row address as a target row address of the first memory and further configured to generate a targeted refresh signal based on a number of receptions of the command for refreshing the target row address in the first memory.

2. The CXL device of claim 1,
   wherein the refresh controller is further configured to set a first threshold value for the number based on metadata of the first memory, and the metadata includes data indicating a target refresh interval (TRI) of the first memory.

3. The CXL device of claim 1,
   wherein the refresh controller is further configured to set a first threshold value for the number for the first memory, to count the number of receptions of the command to generate a first count value, and to generate the targeted refresh signal when the first count value is equal to the first threshold value.

4. The CXL device of claim 3,
   wherein the refresh controller is further configured to generate a first random value and to determine, as the target row address, a row address in the request that is received when the first count value equal to the first random value is generated.

5. The CXL device of claim 4,
   wherein the refresh controller is further configured to generate a new first random value after generating the targeted refresh signal.

6. The CXL device of claim 3,
   wherein the refresh controller is further configured to reset the first count value after generating the targeted refresh signal.

7. The CXL device of claim 1,
   wherein the command is an activate command, a read command, or a write command.

8. The CXL device of claim 1,
   wherein the refresh controller is further configured to transmit the targeted refresh signal to the first memory.

9. A computer system comprising:
   a host configured to generate a request including a memory identifier indicating a first memory of at least one memory, a command, and a row address of the first memory; and
   a CXL device configured to generate a first random value for the first memory, to count a number of receptions of the command to generate a first count value, to determine, as a target row address, a row address in the request that is received when the first count value equal to the first random value is generated, and to generate a targeted refresh signal for refreshing the target row address in the first memory.

10. The computer system of claim 9,
    wherein the CXL device is further configured to set a first threshold value for the first count value for the first memory, and to generate the targeted refresh signal when the first count value is equal to the first threshold value.

11. The computer system of claim 10,
    wherein the CXL device is further configured to set the first threshold value for the first count value based on metadata of the first memory, and the metadata includes data indicating a target refresh interval (TRI) of the first memory.

12. The computer system of claim 9,
    wherein the CXL device is further configured to generate a new first random value after generating the targeted refresh signal.

13. The computer system of claim 9,
    wherein the CXL device is further configured to reset the first count value after generating the targeted refresh signal.

14. The computer system of claim 9,
    wherein the CXL device and the host are connected via one CXL interface.

15. An operation method of a CXL device, the operation method comprising:
    receiving a request including a command and a row address for a CXL device;
    counting a number of receptions of the command to generate a first count value for the CXL device;
    determining whether the first count value is equal to a preset first random value;
    determining whether the first count value is equal to a preset first threshold value; and
    generating a targeted refresh signal for refreshing the row address in the CXL device when the first count value equal to the first random value is generated and when the first count value is equal to the first threshold value.

16. The operation method of a CXL device of claim 15, further comprising:
    setting the first threshold value based on metadata of a first memory among a plurality of memories in the CXL device.

17. The operation method of a CXL device of claim 16,
    wherein the receiving the request comprises receiving a request including a first command and a first row address for the first memory, and
    wherein the generating of the targeted refresh signal comprises generating a first signal for refreshing the first row address among a plurality of row addresses of the first memory.

18. The operation method of a CXL device of claim 16, further comprising:
    transmitting the first signal to the first memory.

19. The operation method of a CXL device of claim 15, further comprising:
   generating a new first random value after generating the targeted refresh signal.

20. The operation method of a CXL device of claim 15, further comprising:
   resetting the first count value after generating the targeted refresh signal.

* * * * *